Nov. 17, 1931.  F. W. HILD  1,832,634
UNIVERSAL ELECTRIC EARTH BORING DEVICE
Filed Jan. 25, 1923   6 Sheets-Sheet 1

WITNESSES:

INVENTOR
Frederic W. Hild.
BY
ATTORNEY

Nov. 17, 1931.　　　　F. W. HILD　　　　1,832,634
UNIVERSAL ELECTRIC EARTH BORING DEVICE
Filed Jan. 25, 1923　　　6 Sheets-Sheet 2
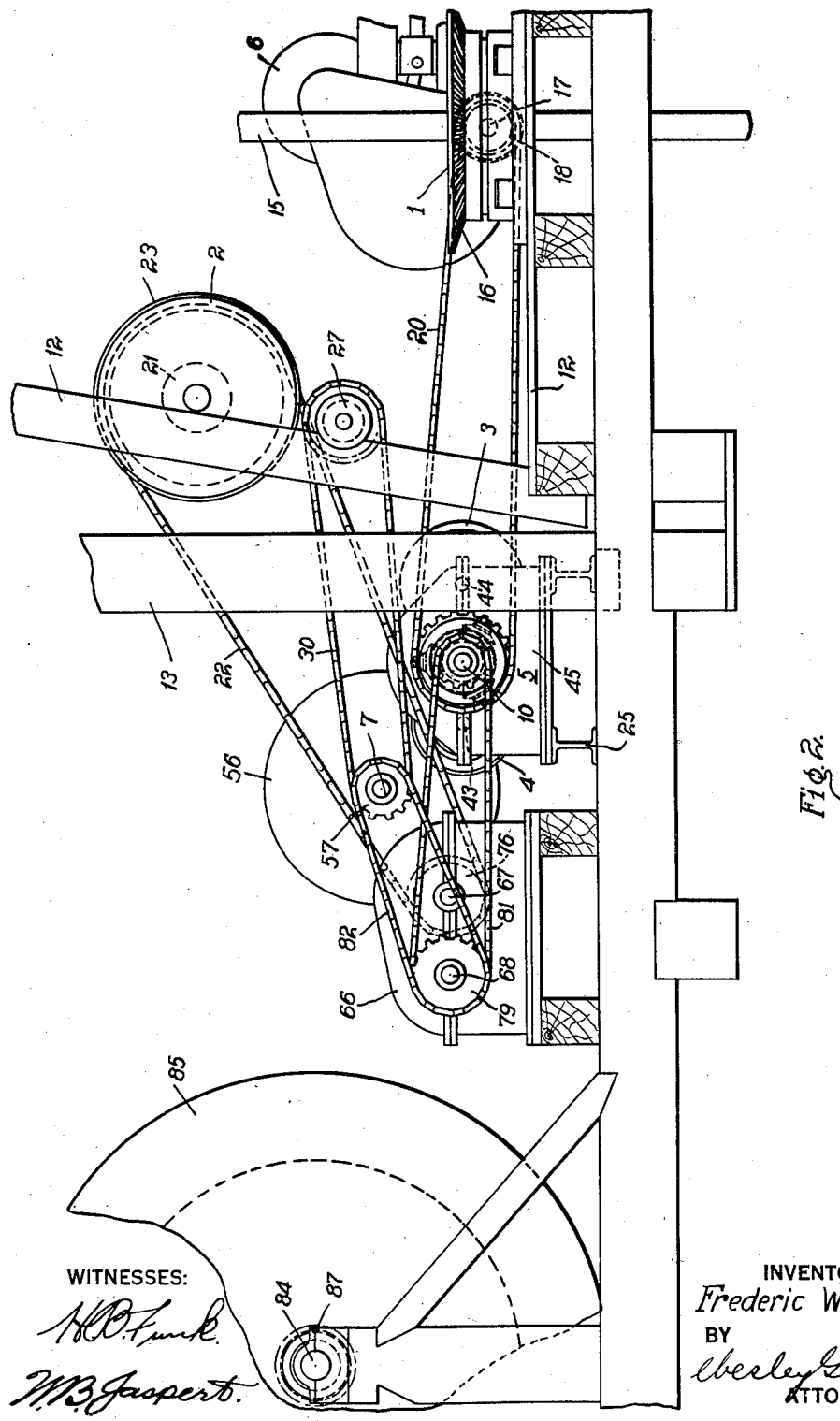
INVENTOR
Frederic W. Hild.
BY
ATTORNEY
WITNESSES:

Nov. 17, 1931.   F. W. HILD   1,832,634
UNIVERSAL ELECTRIC EARTH BORING DEVICE
Filed Jan. 25, 1923   6 Sheets-Sheet 3
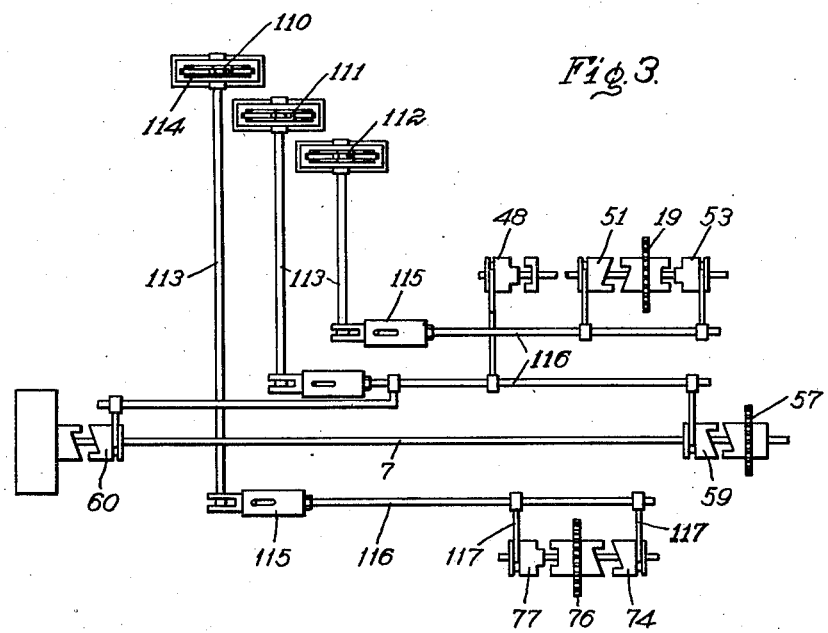
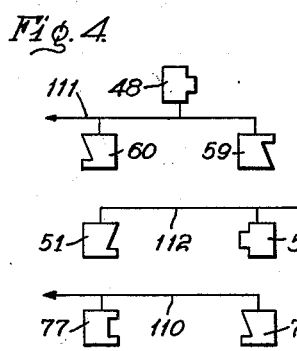
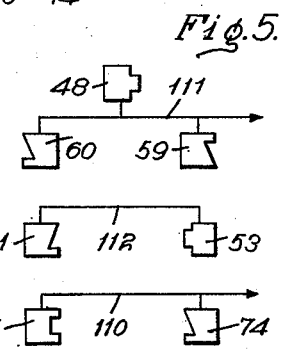
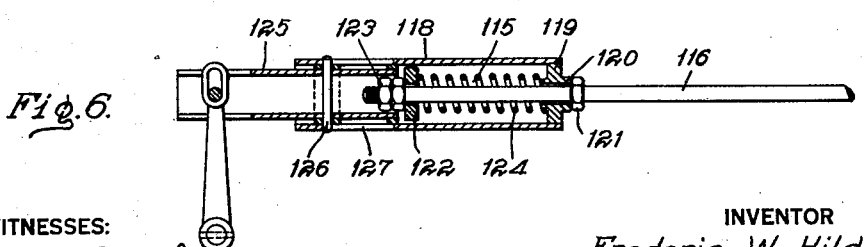
WITNESSES:
INVENTOR
Frederic W. Hild
BY
ATTORNEY

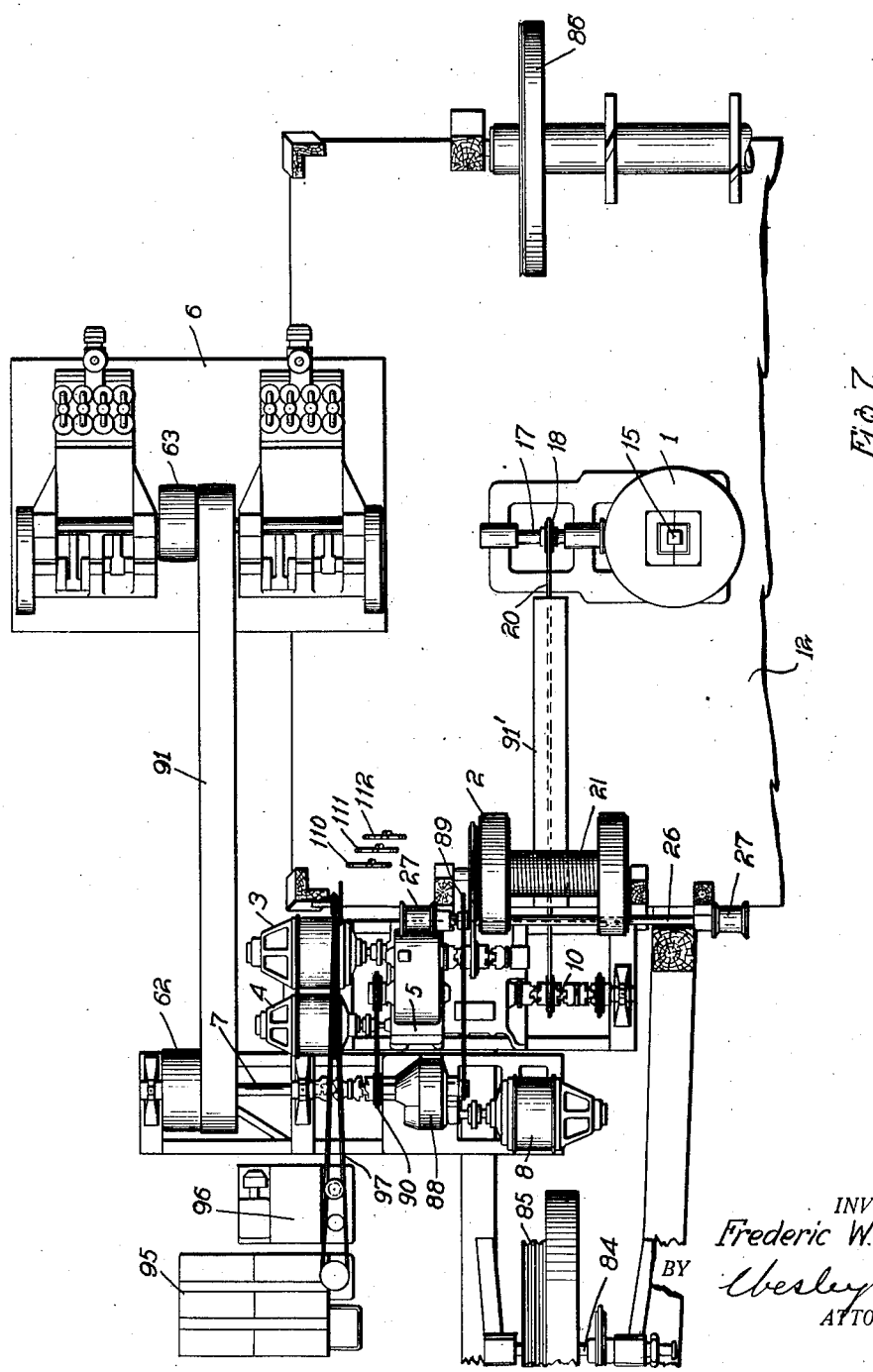

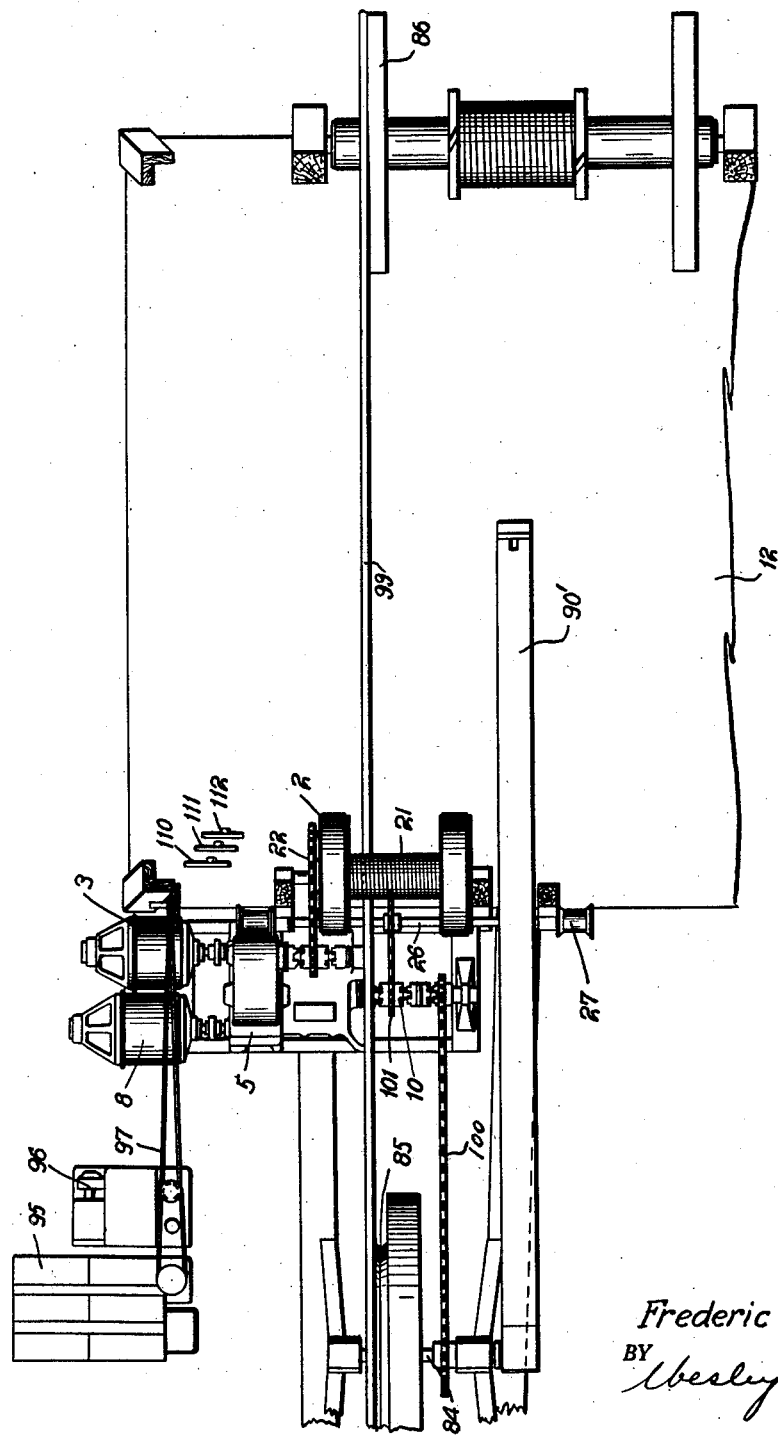

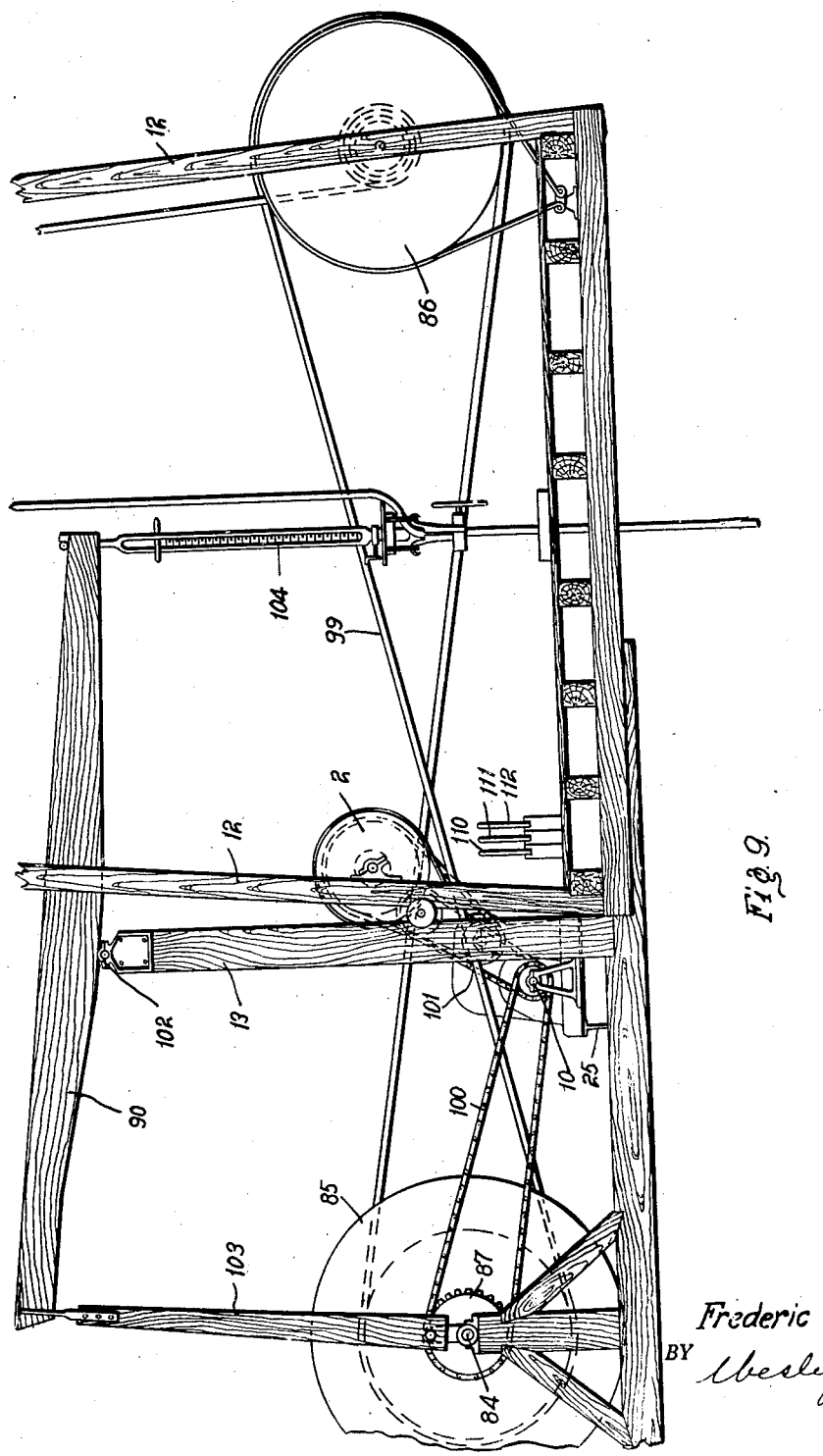

Patented Nov. 17, 1931

1,832,634

UNITED STATES PATENT OFFICE

FREDERIC W. HILD, OF LOS ANGELES, CALIFORNIA

UNIVERSAL ELECTRIC EARTH-BORING DEVICE

Application filed January 25, 1923. Serial No. 614,941.

My invention relates to mining machinery, more especially to earth-boring machines embodying electrical equipment for the various operating functions of drilling, pumping, hoisting and the like.

It is among the objects of my invention to provide a well-drilling and operating system which shall embody a minimum amount of equipment of simple and compact construction; be relatively inexpensive for installation, and economical in operation.

It is a further object of this invention to provide a well-drilling system of the above-indicated character which shall embody an electrical power system of universal application for the multiplicity of functions of drilling and production.

It is still a further object of this invention to provide a drilling mechanism embodying a combination of compact units which may be readily housed, which are interlocked to guard against injury to the operator and which shall employ a minimum amount of floor space.

Earth boring is done principally by the rotary system and the percussion system, and sometimes by the two combined.

In rotary drilling, it has been customary to set up a complete power and drilling plant on the derrick floor, none of which is usable for the percussion system or for the production work. It has required separate and distinct foundations, supports and housing for its constituent parts; so that, after completing the rotary drilling, all the floor machinery must be removed, while the foundation supports and housing cannot be utilized for the succeeding derrick and well-operating functions.

In the percussion system, this holds true to less extent. Much of the apparatus used in this system of drilling remains with the derrick and is used as part of the production equipment. However, it is necessary to replace the engine or motor with another of different capacity and to change some members of the drive and speed-change apparatus.

Thus, in a combination system, three distinct power drives are used for the rotary, for the percussion drilling and the production work. The aggregate of these power-units is far in excess of the maximum power requirements of any one of them. Furthermore, there has been duplication of hoists, countershafts and other parts for similar duty in the three operations of rotary and percussion drilling and production work.

In the customary rotary drilling, the tendency has been to increase the size and weight of the drilling plant to withstand and, to some extent, absorb the severe shock and impact incident to that type of drilling apparatus.

In my copending applications, Serial Nos. 454,451, 614,940, filed March 22, 1921, and Jan. 25, 1923, I have described an earth-boring system using a regulating method which obviates the need for excessively heavy types of apparatus, inasmuch as the regulation of the drill is so perfected as to smooth out the irregularities of the drilling operation and permit a normal strength factor in the equipment used. In the application of this method for well drilling, it is possible to employ smaller power units which are adapted specifically to operate the various accessories incident thereto, and which may be employed as an aggregate plant for the operations requiring the maximum power available, as in rapid hoisting and the like. Thereby, the aggregate of the motor capacity is the minimum for the adequate performance of the services, and is economical not only in manufacturing cost but is most efficient as to load factor, power factor and operating cost.

My present invention is directed to a universal electric well-drilling system embodying a plurality of motors, countershafts, reduction gear and differential gear units, which are interconnected by a suitable power-transmission system to permit operating the rotary machine, the various hoists, the winches, the slush pumps and the walking beam, independently of each other. The transmission is adapted to so associate the motors that their total power output may be utilized for operating the hoists. The mechanism is so arranged that, without changing the location of the drive mechanism and the hoists on the derrick, except to remove the parts not needed in the successive steps, the system will operate any one or more of all of the following: Rotary drilling, percussion drilling, combination rotary and percussion drilling, pumping (in production), pulling and cleaning (in production).

As only one set of foundations, supports and housing is needed, the derrick cost and ground space are much less than with the older systems.

In rotary drilling, the very heavy weights involved and the exigencies of more or less remote field work, preclude friction clutches with their possibility of slipping at critical times. Therefore, positive jaw clutches are quite universally used on the rotating members. As is well known, the clutches must be synchronized to engage or disengage just as the rotation starts, ceases or reverses. When shifting is attempted at even very moderate speed of rotation, the consequence is severe impact and shock, frequently resulting in injury to the workman and breakage of the mechanism.

One of the objects of my invention is to obviate these difficulties by providing springs in the clutch-shifting linkage and by suitably interlocking the various clutch and brake members which may be accomplished both mechanically and electrically.

The rotary machine is customarily driven by a chain from a line shaft so located that the chain impedes freedom of movement of men and materials on one side of the derrick, and such a drive has frequently caused injury to the workers.

My invention remedies these difficulties by placing the chain close to the floor and enclosing it with a suitable housing.

In the accompanying drawings, constituting a part hereof, and in which like reference characters designate like parts, Fig. 1 is a detailed plan view of a well-drilling system embodying the principles of this invention;

Fig. 2 is a side elevational view thereof;

Fig. 3 is a plan view of the clutch-shifting mechanism employed in the system shown in Fig. 1;

Figs. 4 and 5 are diagrammatic views thereof showing the direction the clutch levers are manipulated for the various operations;

Fig. 6 is a cross-sectional view of a spring link employed in the shifting mechanism in Fig. 3;

Fig. 7 is a plan view of a modification of the system shown in Figs. 1, 2 and 3, illustrating a different arrangement of the several working parts;

Fig. 8 is still another modification of my well-drilling system adapted to the percussive drilling operation; and Fig. 9 is a side elevational view thereof.

Figure 1:
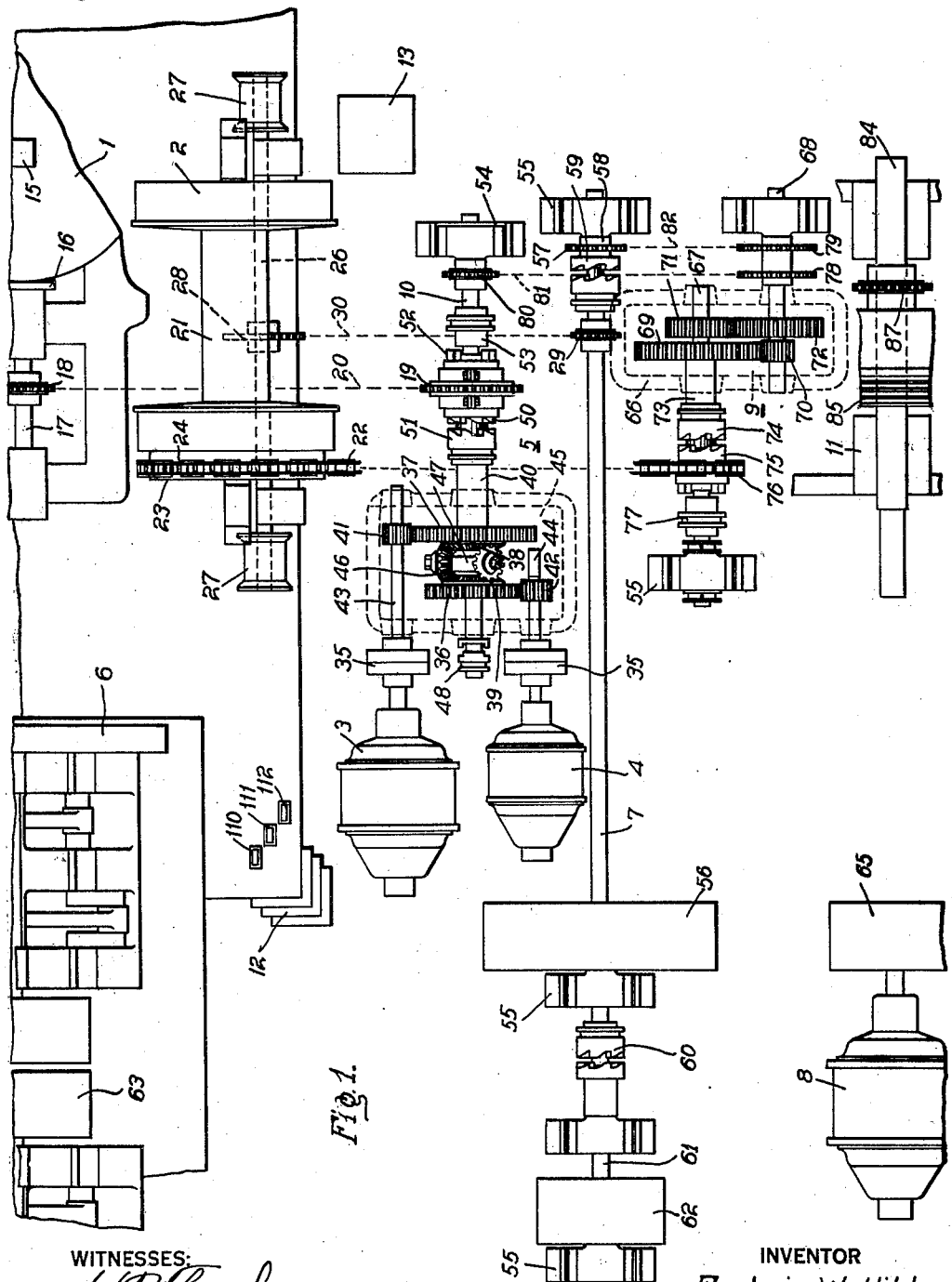

Referring to Fig. 1, my well-drilling system comprises mainly a rotary drill table 1, a hoist or draw works 2, a main drive motor 3, a regulating motor 4 associated therewith, through a differential gear system 5, a plurality of slush pumps 6, a pump countershaft 7 adapted to be connected with said pumps, a motor 8 for driving the pump shaft 7, a reduction gear set 9 adapted to be connected to the main drive shaft 10 of the differential gear set 5 and the pump shaft 7, a band wheel 11, a derrick 12, and a Samson post 13.

The rotary drill 15 is mounted in an opening of the drill table 1, which is engaged by a bevel gear set 16 to a drive shaft 17 having a sprocket wheel 18 mounted therein in alinement with a removable split sprocket wheel 19 of the main drive shaft 10. The sprockets 18 and 19 are connected, by a chain 20, through which the rotary drill is actuated. The draw works 2 is equipped with a cable feed drum 21, which functions to feed the drill pipe that is secured to a steel cable (not shown), extending over the usual crown pulley and wound on the drum, the latter constituting the main draw works for rapid hoisting of the drill casing and the like.

The drum 21 is indirectly connected, through the reduction gears 9, to the main drive shaft 10 by a sprocket chain drive 22, engaged with a sprocket wheel 23 which is mounted directly on the spider 24 of the drum. This drive entirely eliminates the torsional stress existing in prior types of drum shaft and permits a lighter construction of the drum member. In prior types of rotary drilling machinery, the drum 21 was connected through reduction gearing to the driving member, but this is not necessary when a differential drive is employed, through which the speed of feeding the drill is uniformly regulated.

A shaft 26, having a pair of winches 27, mounted on the respective ends thereof, is journaled in proximity to the drum 21, and is provided with a sprocket wheel 28 in alinement with the sprocket 29 of the pump shaft 7, by which it is connected through a sprocket chain 30.

The main drive unit comprises a two-speed motor 3 and a regulating motor 4, which are connected through flexible couplings 35 to the differential 5, and comprise a part of the permanent plant employed for all drilling and production operations. These units may be installed on a permanent foundation, such as a bed plate 25 (Fig. 2).

The differential consists of a pair of spur gears 36 and 37 having integral or attached bevel gears 38 and 39, which are mounted respectively on a sleeve 40, and the main drive shaft 10, extending therethrough. The gears 36 and 37 are engaged with pinions 41 and 42, respectively mounted on the shafts 43 and 44, which are journaled in the gear case or housing 45. A plurality of planetary gears 46 is mounted on a hub 47, which is keyed to the shaft 10 and constitutes part of the differential gear. A clutch 48 is provided on the end of the shaft 10 to lock the main shaft 10 to the gear 36, thereby locking gears 39, 46, 38 and 37 also to shaft 10. The differential may be locked on one side for changing the speed ratio, when desired.

The split sprocket wheel 19 is idly mounted on the shaft 10, and is provided with spiral clutch jaws 50 on one side, adapted to engage correspondingly shaped jaws of a movable clutch 51, and the opposite face of the sprocket 19 is provided with square clutch jaws 52, adapted to cooperatively engage the clutch 53. The main drive shaft 10 is rotatably journaled in the housing 45 and a pillar block bearing 54.

The slush pump countershaft 7 is journaled in suitable pillar block bearings 55 and is provided with a pulley 56, sprocket gear 29, and a sprocket gear wheel 57, which is mounted on the extending hub portion 58 of a spiral clutch 59. On its opposite end, the shaft 7 is provided with a spiral clutch 60, which is adapted to engage an idle shaft 61, journaled in the pillar block bearings 55, which is provided with a pulley 62 to provide a belt connection with the pulleys 63 of the slush pumps 6. The pulley 56 is in alinement with the motor pulley 65 and is connected to the motor 8 by a belt (not shown).

The reduction gear unit 9 comprises a housing or gear case 66, having a pair of shafts 67 and 68, journaled therein, and having their extending ends supported by the pillar block bearings 55. A plurality of spur gears 69 and 70 and 71 and 72 are mounted on the shafts 67 and 68, respectively. The gear wheel 69, which is adapted to rotate on shaft 67, is provided with an extension sleeve 73 having a spiral clutch 74, associated therewith, adapted to engage the hub 75 of the sprocket wheel 76, which is free to rotate on shaft 67. The opposite side of the wheel 76 is adapted to co-operate with a square-jawed clutch 77, which is splined to shaft 67. A pair of sprocket gear wheels 78 and 79 are mounted on the shaft 69, outside of the gear case 66, and are connected to sprocket wheels 80 and 57 by sprocket chains 81 and 82, respectively.

The bandwheel mounting 11 consists of a crank shaft 84 having a grooved wheel 85 mounted thereon, which is adapted to be employed in conjunction with a bull wheel 86 (Figs. 7, 8 and 9) for cable tool drilling. The shaft 84 is connected by a sprocket gear 87 to the main drive shaft 10.

As shown in Fig. 3, the engaging clutches are connected by a system of shifting links to levers 110, 111 and 112, located in a convenient corner of the derrick 12. The levers are secured to shafts 113 and operated on notched segments 114. Lever 110 is connected by a spring link 115 to a shifting rod 116, having a pair of trunnion yokes 117 secured thereto for engaging clutches 74 and 77. Lever 111 is likewise adapted to manipulate clutches 48, 59 and 60, and lever 112 is adapted to operate clutches 51 and 53.

The spring links 115, (Figs. 3 and 6) comprise a tubular housing 118, provided with plugs 119 having an opening 120 adapted to receive the rods 116 which are provided with stop nuts 121, movable collars 122 and lock nuts 123. Coil springs 124 are disposed between the plugs 119 and collars 122 and are put under an initial tension by adjusting the nuts 123 to stabilize the neutral position of the clutches. A tube 125, disposed within the housing 118, is movably connected therewith, by a pin 126, adapted to move in the longitudinal slots 127.

When the shifting levers are manipulated, the tubes 125 are pressed against the collars 122, actuating the rods 116 through the springs 124, thereby providing a resilient connection between the shifting levers and the clutches.

For reversing the clutches, the levers are moved to the opposite direction and the pins 126 move the housings 118 against the springs 125, thereby actuating the rods 116 in the reverse direction.

The operation of this device is briefly as follows:—The function of drilling is performed by the motors 3 and 4, through the differential 5 and main drive shaft 10, by a chain connection 20 to the rotary drive shaft 17. As explained in my copending applications, the motors and the differential function to regulate the feed of the drill in accordance with the resistance encountered by the drill bit for the varying formation of the soil. The feeding of the drill is automatically controlled through the drum 21 by its connection with the shaft 10, through the reduction gear 9. In the drilling operation, the sprockets 19 and 76 are engaged with the spiral jaw clutches 51 and 74. The drill table 1 and the feed drum 21 are both actuated through the differential gears 5 by the drive motor 3 and its associated regulating motor 4.

The pumps 6 are simultaneously operated through the countershaft 7 by the motor 8 when the spiral clutch 60 is in engagement.

When the drum 21 is employed for hoisting purposes, the spiral jaw clutches 51, 60 and 74 become disengaged. The square jaw clutches 53 and 77 are engaged to couple the motors 3, 4 and 8 through the reduction gears 71 and 72 and the sprocket chain 22 to the drum 21, thereby bringing all the available power into use for high-speed hoisting.

The differential and motor control (not shown) is arranged to provide various speeds of the drive shaft 10 and the draw works 2, as explained in detail in my copending applications.

Figs. 4 and 5 diagrammatically illustrate the direction in which the levers are adjusted for the operations of drilling (Fig. 4) and rapid hoisting (Fig. 5). The arrows represent the levers and for drilling lever 110 is adjusted to the left notch of the segment 114, lever 111 to the left, also, and lever 112 to the right. For hoisting, lever 110 is adjusted to the right, lever 111 to the right and lever 112 is placed in neutral. The clutches are thus engaged and disengaged for the purpose of, and in accordance with, the operation of my mechanism, as described above. Various speed combinations other than those illustrated are possible to obtain with my shifting mechanism and it is obvious that the spring links prevent shock or rebound incident to present devices.

As illustrated in Fig. 7, various modifications of the universal system are possible with but slight changes in the design and location of the working parts. The general arrangement of the drill rotary 1, the draw works 2, the main drive motors 3 and 4 and the differential 5 are the same as described above. The pump countershaft 7 is coupled direct with the pump motor 8, and a reduction gear 88, and is adapted to be connected to the winch shaft 26 by a chain drive 89.

The reduction gear set 9 is located above the differential 5 and is geared thereto. A chain connection 90 is provided from the pump countershaft 7 to the gear set 9 to connect the pump motor 8 with the draw works 2 through the chain drive 22. The pumps 6 are operated by a belt 91 connected with pulleys 62 and 63 to the countershaft 7 and pump shaft, respectively. The drill table is connected to the main drive shaft 10 by a chain drive 20, as above, which may be enclosed by a guard 91' to protect the operator. Additional equipment not shown in Figs. 1 and 2 consists of electrical control apparatus 95 and 96 for the motors 3, 4 and 8, which is connected by suitable chain or cable 97 to a manual control unit, which is located in proximity to the draw works 2 for the convenience of the operator. There are three clutch levers, 110, 111 and 112, respectively, one for changing the speed ratio of the differential through the clutch 48 and for operating the clutches 59 and 60 on the pump countershaft, Fig. 3, and one each for manipulating the clutches of the sprocket wheels 19 and 76 respectively.

The above description of my invention serves to illustrate the equipment of the universal electric drive necessary for the rotary drilling work, but my apparatus is also applicable to cable tool drilling and may be employed as a combination system for rotary and cable tool work. As illustrated in Figs. 8 and 9, by the addition of the bull wheel 86 and the walking beam 90, which is pivotally mounted on the Samson post 13, the system may be arranged for cable tool drilling, and the reduction gear unit 9, which is not a part of the permanent plant, may be located underneath the draw works 2 to which it is connected. The bull wheel 86 is connected in the usual manner by a rope drive 99. The pump motor 8, which is ordinarily of greater capacity than the main drive motors 3 and 4, may be substituted for the motor 4 to obtain a greater capacity for cable tool work.

The pumps 6 and the countershaft 7 are removed for cable tool drilling. The main drive shaft 10 is connected by a chain 100 to the sprocket wheel 87 of the bandwheel 85. The winch shaft 26 is connected by a chain drive 101 to the drive shaft 10. The walking beam 90' is oscillated about a hinge 102 on the post 13 by a connecting rod 103, pivoted to the crank shaft 84, and its other end is co-operatively engaged with a temper screw 104.

At the completion of the drilling operations, the motor 3, its control and the differential gear unit, are maintained in their original position for the final production of pumping and the like. The other motors, controllers, and the reduction gear unit are removed.

It is evident, from the above description of my invention, that a device such as I propose is universal in its application to the drilling of wells by either the rotary or cable tool method and that it adequately and fully meets all the requirements for positive and convenient control, and for the accessibility of parts. It facilitates arrangements and combinations of the mechanism for the various operations, reduces materially the cost of production, provides safety to the operator, and permits a speed of operation unattainable in prior devices.

Although I have described a specific embodiment of my invention, it will be obvious to those skilled in the art that various changes may be made in the details and combinations of my device without departing from the principles herein set forth. For instance, my device may generally be utilized with the present type of equipment employing the rotary drum, the calf wheel, the sand reel and a less number of larger power units. The shaft drive may be substituted for the chain drive of the rotary; and belts or positive gear connections may be substituted for the sprocket drives.

I claim as my invention:—

In a drilling system having a rotary table to rotate a drill string and having means to suspend the string from a cable, a differential device having two sun gears and a planetary gearing, two motors having parallel shafts, a shaft parallel to the motor shafts for supporting the differential device, a hoist disposed parallel to said shafts for winding the cable, one of the motors being in direct driving connection with one sun gear and the rotary table, the second motor being in direct driving connection with the other sun gear and means for operatively connecting the planetary gearing with the hoist.

In testimony whereof, I have hereunto subscribed my name this twentieth day of January, 1923.

FREDERIC W. HILD.